United States Patent Office 2,879,575
Patented Mar. 31, 1959

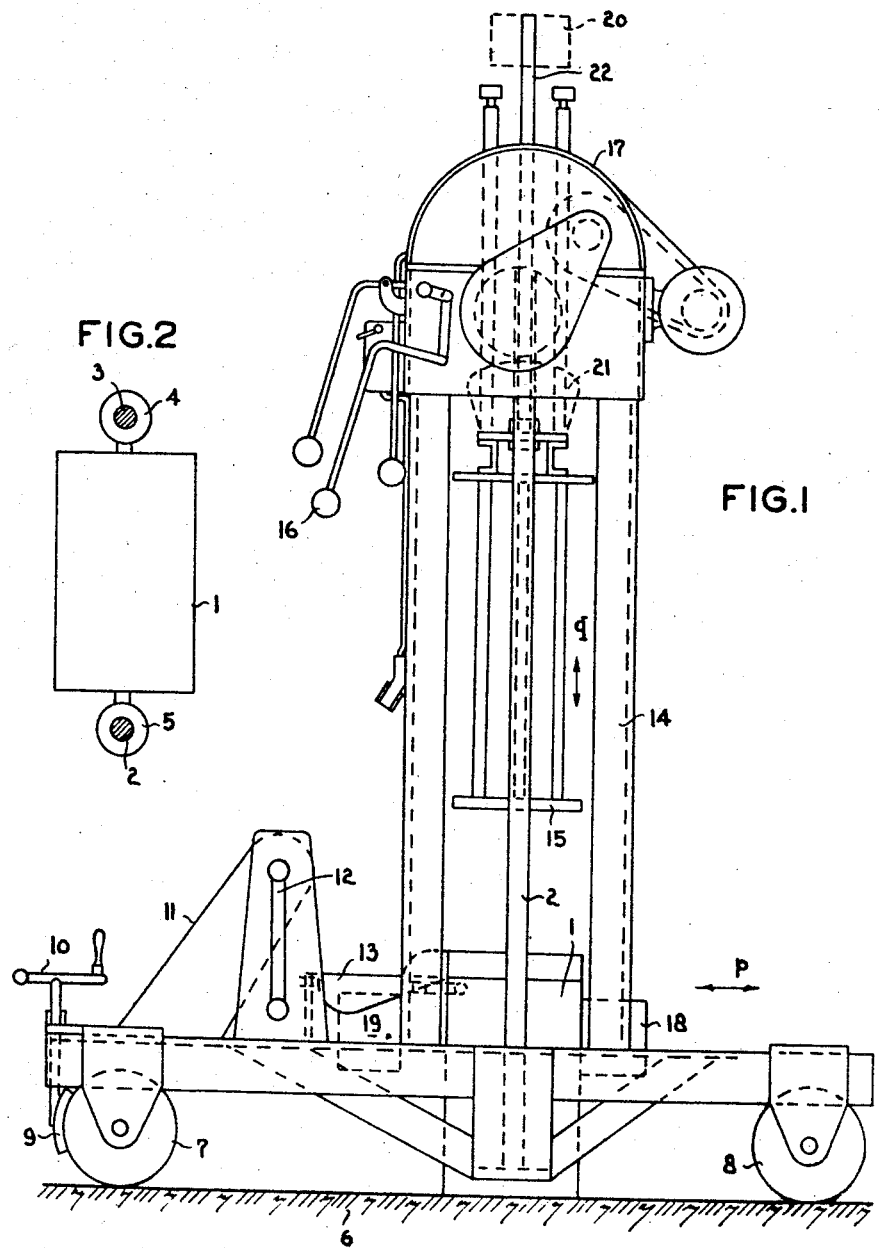

2,879,575

APPARATUS FOR PRODUCING CONCRETE PRODUCTS ON A FLOOR

Jan Hendrik Lutherus Giesen, Laren, Netherlands

Application March 27, 1953, Serial No. 345,133

1 Claim. (Cl. 25—41)

The invention relates to an apparatus for the production of concrete products in moulds.

More particularly, the present invention is concerned with an apparatus for the manufacture of dense and solid concrete products to be delivered from a mould onto a floor.

The invention is particularly concerned with the provision of an apparatus for a quick production of concrete objects of considerable height, e.g. 20 inches or more, such as tubes and blocks, and especially hollow blocks.

When the height of concrete products to be produced in moulds is rather large, it is not facile to deliver moulded articles that come up to high requirements as to quality, e.g. having a uniform density and showing no tendency to crack.

It is therefore an object of the invention to produce concrete blocks at high speed on the floor, said blocks or rows of them being delivered on said floor from moulds, the spaces between subsequent blocks or row thereof being very small e.g. only parts of an inch and the danger of damaging the blocks by vibrations of the floor being completely eliminated.

With these objects in view the invention provides an apparatus for the production of concrete products in a hollow mould, which is open at the bottom and which has walls connected to form a rigid body. The mould is placed on a floor and filled, after which a die or cover is lowered or inserted into the mould through an open top thereof, the latter being subsequently lifted from the floor to leave the moulded product on said floor. The mould together with the die and frames associated therewith are subsequently moved along the floor in order to form additional concrete products, in which said mould during and after filling is provided with first means for vibrating it in a direction perpendicular to the movement of the die. The die or cover during action on the mass in the mould being vibrated by a second vibrating means for a predetermined period in the direction of its movement therewith excluding any ramming or beating action in the mass. The first and second vibrating means are synchronised so as to vibrate the mould and cover with the same number of vibration per unit of time or frequency and with a constant phase angle between the respective vibrations.

With such an apparatus practically no vibrations are transferred to the floor so that successive concrete products can be formed closely adjacent to each other on the floor.

It is to be observed that when machines having a mould which rests or stands on a floor and the mould is filled and a die operates upon the mass in the mould with a striking or hammering movement, such movement may have a very disadvantageous effect and the moulded articles, which are produced thereby, have a density which considerably varies from one place to another, and moreover the floor is caused to vibrate, which may have a bad influence on the moulded articles that have been placed aside on the floor.

A further object of this invention is to overcome these difficulties and to provide an improved apparatus for producing concrete on a floor of the above character which is of simple design and construction and highly efficient in the accomplishment of its intended purpose.

In accordance with the present invention, there is provided an apparatus comprising a frame which is supported for movement over a floor, a hollow rigid mould which is open at the top and bottom thereof is supported on the frame so as to permit vertical movement of the mould toward and away from a position of rest on the floor, a cover supported on the frame for vertical movement into and out of the open top of the mould when the latter is in its rest position, first means for vibrating the mould in a direction perpendicular to the movement of the mould relative to the frame, and second means for vibrating the cover when the latter is inserted into the open top of the mould and in the direction of the movement of the cover into and out of the mould, the first and second vibrating means being synchronized to vibrate the mould and cover at the same frequency and with a constant phase angle between the respective vibrations.

When magnetic vibrators are used and both are fed from a common source of alternating current the vibrators will be automatically synchronised.

The objects, advantages and nature of the invention will be more fully understood from the following description of the preferred embodiment of the invention, shown by way of example, in the accompanying drawing, in which:

Fig. 1 is an elevational view of the apparatus in accordance with the invention;

Fig. 2 is a plan view of the mould and guide columns forming part of the apparatus of Fig. 1.

In Figs. 1 and 2 which illustrate the best mode now contemplated by me for carrying out my invention, a hollow rigid mould 1 open at the top and bottom thereof having one or more cavities in accordance with the shape of the object to be moulded is carried by the apparatus and may be guided by columns 2 and 3 for vertical movement by means of rings 4 and 5 (cf. Figure 2) toward and away from a position of rest on a floor 6. Absorbing material, such as rubber, is arranged between the rings 4 and 5 and the columns 2 and 3. Thus it is made substantially impossible for vibrations of the mould to be transmitted to the frame of the machine and thence to the working floor 6.

The apparatus is supported on the floor for movement thereover by wheels 7 and 8, 9 is a blocking apparatus for the wheels, which may be fixed or released by a handwheel 10. The machine may be moved by driving a set of wheels by means of a transmission 11 and a handle 12. The mould may be filled by means of a trough 13. The apparatus has a vertical part 14 in which a die or cover 15 is guided for vertical movement relative to the mould 1. After the mould has been filled this die can be lowered for vertical movement from a high position shown in the drawing through the open top of the mould when the latter is at rest without any striking or hammering movement and by means of levers such as 16 and a driving gear positioned in the head 17 of the machine. The die or cover then comes to work on the mass in the mould through the open top thereof.

A first vibrator for causing the mould to vibrate in a horizontal direction (cf. the arrow $p$) is arranged at 18 or 19. The mould is vibrated in a direction perpendicular to the movement of the mould relative to the frame. A second vibrator cooperating with the die or cover 15 is mounted at 20 or 21 so that the die 15 can practically vibrate only in a vertical direction (arrow $q$). The second vibrator vibrates the cover 15 when the latter is inserted into the open top of the mould and in the direction of movement into and out of the mould.

Various kinds of vibrators may be used, such as magnetic vibrators or vibrators with a rotating non-balanced element. Vibrators of the latter type often cause vibrations in one direction as well as in another. However, when such a vibrator is positioned somewhere near 20, i.e. at the end of a rod 22 connected with the die 15 and serving the driving of it, the horizontal vibrations may be kept away from the die 15 itself by being absorbed in the elasticity of the rod 22 or at the other places between 20 and the die 15.

It has proved to be of great importance that the vibrators acting upon the mould and on the die should be synchronised as much as possible. Accordingly, the first vibrator 18, 19 and the second vibrator 20 or 21 are synchronized to vibrate the mould 1 and cover 15 at the same frequency and with a constant phase angle between the respective vibrations.

In operation the mould 1 is filled and vibrated horizontally by means of the first vibrator 18, 19. The die 15 is lowered into the mould and then vibrated vertically by means of the second vibrator 20 or 21, while the mould is being horizontally vibrated.

After the object has been moulded and vibrated, or densified, in the mould, the latter is lifted by means of a driving mechanism also positioned in the head 17 and the object thus moulded is left behind on the working floor.

Then the machine is moved on a little and the process is repeated.

Simultaneous vibrating of the mould and the die is stopped as soon as the densification of the material in the mould has come to an end.

While there has been described what is at present considered to be a preferred embodiment of the invention, it will be obvious to those skilled in the art that various changes and modifications may be made without departing from the scope of the invention.

What I claim is:

Apparatus for producing concrete products an a floor; said apparatus comprising a frame, means supporting said frame for movement of the latter over a floor, a hollow rigid mould open at the top and bottom thereof, means supporting said mould on said frame and permitting vertical movement of said mould toward and away from a position of rest on the floor, a cover insertable into the open top of said mould, means supporting said cover on said frame for vertical movement into and out of the open top of the mould when the latter is in said position of rest, first means for vibrating said mould in a direction perpendicular to the movement of said mould relative to the frame, and second means for vibrating said cover when the latter is inserted in the open top of the mould and in the direction of the movement of said cover into and out of said mould, said first and second vibrating means being synchronized to vibrate said mould and cover at the same frequency and with a constant phase angle between the respective vibrations.

References Cited in the file of this patent
UNITED STATES PATENTS

| Number | Name | Date |
|---|---|---|
| 805,914 | Horr | Nov. 28, 1905 |
| 812,123 | Forbes | Feb. 6, 1906 |
| 937,781 | Eddy | Oct. 26, 1909 |
| 1,936,216 | Straub et al. | Nov. 21, 1933 |
| 2,303,884 | Krehbiel et al. | Dec. 1, 1942 |
| 2,341,012 | Billman et al. | Feb. 8, 1944 |
| 2,382,458 | Williams et al. | Aug. 14, 1945 |
| 2,407,168 | Lindkvist | Sept. 3, 1946 |
| 2,446,061 | Reed | July 27, 1948 |